US010186236B2

(12) United States Patent
Akenine-Moller et al.

(10) Patent No.: US 10,186,236 B2
(45) Date of Patent: Jan. 22, 2019

(54) UNIVERSAL CODEC

(71) Applicant: Intel Corporation, Santa Clara, CA (US)

(72) Inventors: Tomas G. Akenine-Moller, Lund (SE); Jim Nilsson, Lund (SE); Magnus Andersson, Helsingborg (SE)

(73) Assignee: INTEL CORPORATION, Santa Clara, CA (US)

( * ) Notice: Subject to any disclaimer, the term of this patent is extended or adjusted under 35 U.S.C. 154(b) by 124 days.

(21) Appl. No.: 13/901,086

(22) Filed: May 23, 2013

(65) Prior Publication Data

US 2014/0347380 A1 Nov. 27, 2014

(51) Int. Cl.
*G06T 1/60* (2006.01)
*G09G 5/39* (2006.01)

(52) U.S. Cl.
CPC ........... *G09G 5/39* (2013.01); *G09G 2340/02* (2013.01); *G09G 2360/02* (2013.01)

(58) Field of Classification Search
CPC .. G06T 1/60; G09G 2340/02; G09G 2360/02; G09G 5/39
USPC .......................................................... 345/555
See application file for complete search history.

(56) References Cited

U.S. PATENT DOCUMENTS 6,215,507 B1 * 4/2001 Nally ...................... G09G 5/39 345/540
6,842,797 B1 * 1/2005 Lawande ........................ 710/35
2002/0031241 A1 * 3/2002 Kawaguchi et al. ......... 382/100
2002/0159523 A1 * 10/2002 Wang et al. ............. 375/240.05
2005/0012759 A1 * 1/2005 Valmiki et al. ............... 345/629
2006/0098858 A1 * 5/2006 Guittet ............... G06K 9/00127 382/133
2009/0295816 A1 * 12/2009 Kallio ........................... 345/553
2010/0328303 A1 * 12/2010 Akenine-Moller .......................... G06T 15/005 345/419
2011/0243469 A1 * 10/2011 McAllister et al. .......... 382/239
2014/0068168 A1 * 3/2014 Murrin et al. ................ 711/105

FOREIGN PATENT DOCUMENTS

WO WO 2012082029 A1 * 6/2012 ............ H04N 19/46

OTHER PUBLICATIONS

Hasselgren, J. Et Al, 2006. Efficient Depth Buffer Compression. In Graphics Hardware, pp. 103-110.
Rassmusson, J. Et Al, Exact and Error-Bounded Approvimate Color Buffer Compression and Decompression, Graphics Hardware, 2007.
Strom, J. Et Al, "Floating-point Buffer Compression in a Unified Codec Architecture". Graphics Hardware, pp. 75-84, 2008.
Rasmusson, J. Et Al, "Error-Bounded lossy compression of Floating-Point Color Buffers using Quadtree Decomposition", The Visual Computer, vol. 26, No. 1, pp. 17-30, 2008.
Pool et al., 2011 "Lossless Compression of Variable-Precision Floating-Point Buffers on GPUs". 13D 2011.

* cited by examiner

*Primary Examiner* — Ke Xiao
*Assistant Examiner* — Kim-Thanh T Tran

(57) ABSTRACT

Techniques related to coding data including techniques for coding data using a universal codec are generally described. In some examples, such techniques may provide a universal (or unified) codec parameterized using a small set of parameters, which may be used to adapt the codec to different types of data to be compressed.

24 Claims, 10 Drawing Sheets

UNIVERSAL CODEC

BACKGROUND

In general, compression and decompression (codec) techniques may be implemented to reduce memory bandwidth usage in graphics processors or central processor units. Such savings may be used to lower power consumption, which may be valuable in devices such as phones or tablets or the like. Further, such savings may be valuable for lower power and/or higher performance in implementations such as laptop computers, desktop computers, desktop graphics implementations, or the like.

Various codec techniques have been proposed and are in use. For example, in graphics processing, depth compression, color compression, floating-point depth compression, floating-point color, and the like may be implemented. Further, universal codecs have been proposed that may compress depth, color, and/or vertex data. Some examples, may structure the data to compress as a list of values, compute the differences between consecutive values in the list, and applies entropy encoding (e.g., Fibonacci encoding) to the differences. Such examples may offer the advantage of the same implementation at both an encoder and a decoder; however, applying the same techniques to all types of data may cause significant inefficiencies in the data compression.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
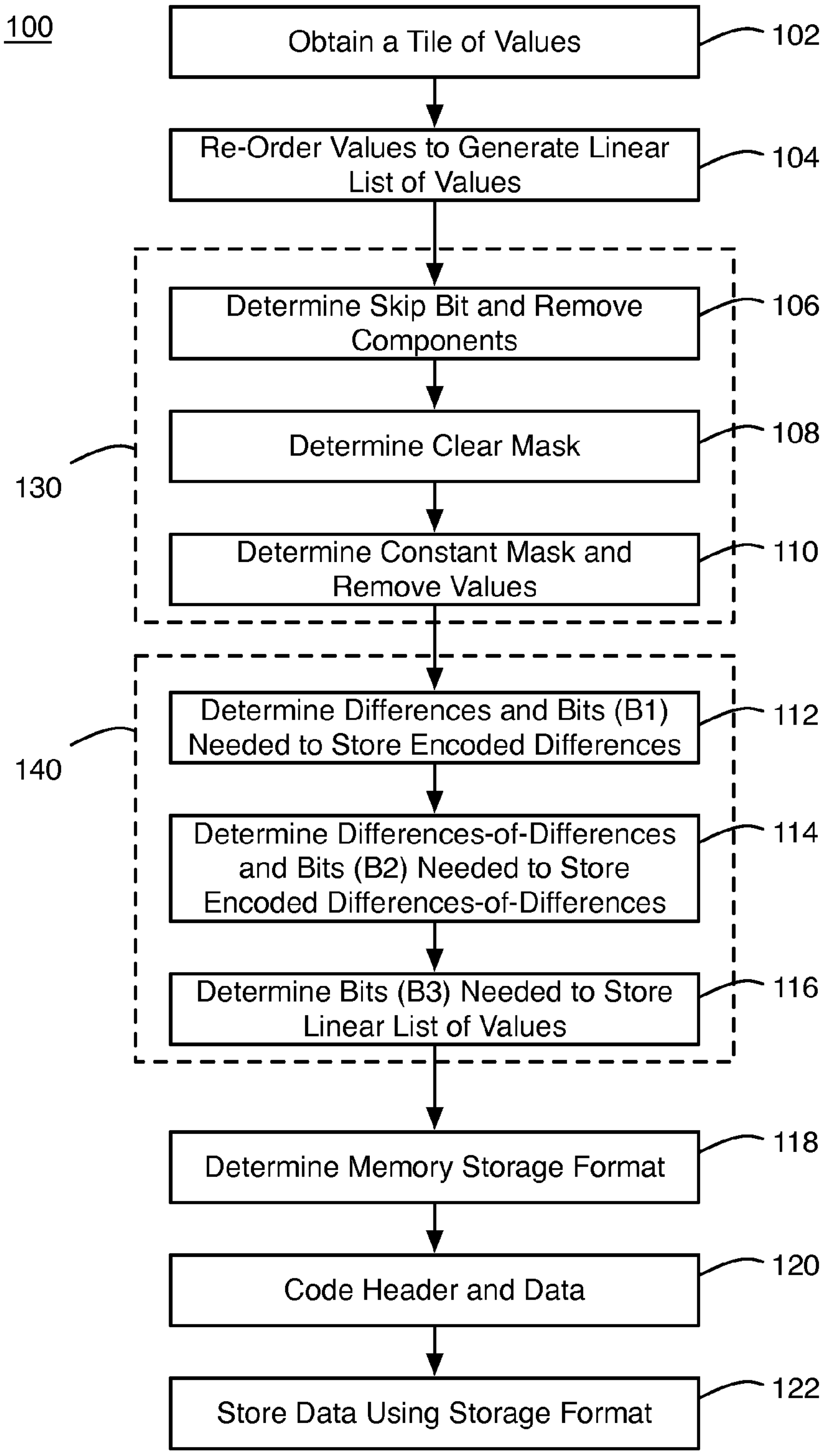
FIG. 1 is an illustrative diagram of an example process for compressing data.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to coding data including techniques for coding data using a universal codec.

As described above, compression and decompression (codec) techniques may be implemented to reduce memory bandwidth usage in graphics processors or central processor units. Such savings may be used to lower power consumption and/or increase performance in computer-implemented devices such as phones, tablets, laptop computers, desktop computers, or the like.

As will be described in greater detail below, data (e.g., a tile of a plurality of values or a list of values) to be compressed may be obtained or generated. The values may be any suitable values such as integers, floating point values, or the like and may represent any suitable object or objects such as, for example, depth data or color data for pixels of the tile. In some examples, the individual values may include multiple components. For example, color values may be include multiple components (e.g., red green blue alpha-RGBA-color values may be include components associated with red, green, blue, and alpha). In general, the aim of the discussed codec techniques may be to achieve a bit budget. For example, memory bandwidth may be associated with a limit or a cache line or the like which may provide limits (e.g., 512 bits or the like) for memory transactions. If a codec may transmit or store data less than the limit, the number of transactions associated with the data may be reduced saving power and increasing performance. In a simplistic example, 600 bits of data uncompressed on a 512 bit cache line may require two transactions but, if compressed to 500 bits, the data may require one transaction.

As discussed, data such as a tile of a plurality of values or a list of values or the like may be obtained or generated. As is discussed further below, in some examples, the data may be re-organized into a linear list of values. Such re-organization may order the values into a listing that may make compression more efficient for example. In general, the data may be re-organized using a technique associated with the type of data. For example, color data may be organized using a technique that may extract coherency, depth data may be organized using a technique that pairs substantially adjacent pixels, and so on. The linear list of values may be further processed to generate skip bit(s) (e.g., bits that indicate a particular component of all values in the linear list are constant) and remove values associated with the skip bit (e.g., that value may stored only once in the linear list), to determine a clear mask (e.g., a mask that indicates one or more values have been removed from the linear list), and/or to determine a constant mask or masks (e.g., a mask to indicate consecutive values are the same and have not been repeated). In general, any or all (or none) of such processing techniques may be applied with the result being a linear list of values and/or header information for decompression of the data.

Based on the determined linear list of values (either as obtained or generated or as further processed), a plurality of differences and a plurality of differences-of-differences may be determined. The differences may include the differences between consecutive values in the list and the differences-of-differences may include the differences between the differences. When calculating differences, or differences-of-differences, it may also be possible to consider non-consecutive numbers in the list, so that differences and differences-of-differences depend not only on adjacent values in the list of values, but also on values to the left, to the right, above, or below, a particular point in the tile. In general, any combination of values in the tile may be used to create the linear list of values. In general, the differences and the differences-of-differences may provide advantages in compression depending on the type of data in the linear list of data. For example, differences may be more efficient for color data and differences-of-differences may be more efficient for depth data. In any event, based on the differences, a number of bits needed to store the differences encoded using an encoding technique may be determined. Similarly, a number of bits needed to store the differences-of-differences encoded using an encoding technique (which may be the same as or different than the encoding technique for the differences) may be determined. Further, a number of bits needed to store the linear list of values uncompressed, may be determined. Based on the number of bits needed for each, a memory storage format may be determined. For example, if only one of the techniques meets a bit budget (as discussed), that technique may be chosen for the memory storage format. If two or more meet the same bit budget, the most efficient technique or the technique that uses the least power may be chosen, for example. In general, any number of bit budgets may be available such that a technique that meets the smallest bit budget may be chosen. If none of the techniques meet a bit budget, compression may have failed and the memory storage format may default to the linear list of values. In any case, the data associated with the linear list of values and formatted according to the determined memory format may be stored in memory. Further, a header may be stored such that the header is associated with the data and may include, for example, any skip bits, clear masks, constant masks, or the like and/or one or more values from the linear list of values (e.g., the first value in the list).

In general, such techniques may provide a universal (or unified) codec parameterized using a small set of parameters, which may be used to adapt the codec to different types of data to be compressed. Using such techniques, better compression ratios may be achieved. Implementing such universal codecs may reduce the number compressors and/or decompressors in a device offering simplicity and hardware and power savings. Further, such techniques may be implemented graphics processing units (GPUs) and/or central processing units (CPUs), particularly as data is shared more frequently between GPUs and CPUs in modern computing device architectures.

As used herein, the term "codec" may refer to any process, program or set of operations, such as, for example, any combination of software, firmware, and/or hardware, that may implement a compression or decompression technique. Similarly, as used herein, the term "coding" and "decoding" may refer to performing data compression and decompression via compressor or decompressor, respectively. Further, the term "codec module" may refer to any process, program or set of operations, such as, for example, any combination of software, firmware, and/or hardware that may implement a compressor or a decompressor or both. For example a compressor and a decompressor may both be examples of codec modules capable of compressing or decompressing data such as image data or the like.

FIG. 1 is an illustrative diagram of an example process 100 for coding data, arranged in accordance with at least some implementations of the present disclosure. In general, process 100 may provide a computer-implemented method for coding data. In the illustrated implementation, process 100 may include one or more operations, functions or actions as illustrated by one or more of blocks 102, 104, 106, 108, 110, 112, 114, 116, 118, 120, and/or 122. However, embodiments herein may include any number of blocks 102-122 such that some may be skipped or the like. Further, various embodiments may include additional operations not shown for the sake of clarity.

Figure 2:
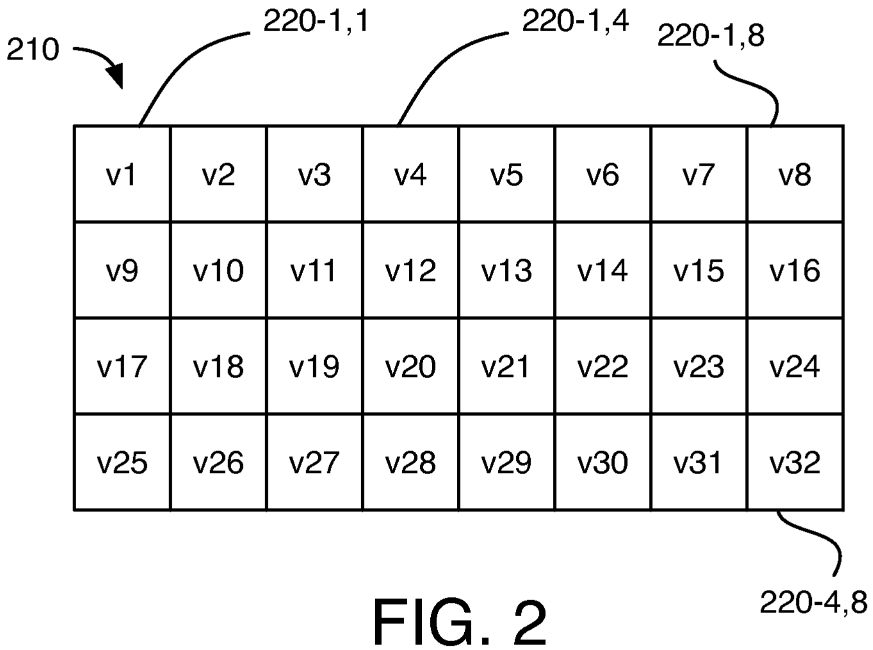
FIG. 2 illustrates an example tile of values.

Process 100 may begin at block 102, "Obtain a Tile of Values", where a tile of values may be obtained by, for example, a codec module implemented via a graphic processing unit or a central processing unit or the like. The tile of values may be obtained using any suitable technique such as retrieving the tile of values from memory or generating the tile of values at a codec module, or the like. As is discussed further below, a codec module may be implemented via a graphics processing unit (GPU) or central processing unit (CPU) or the like. In general, the tile of values may include any suitable data representing any object or objects. A tile of values may include, for example, a linear array of values, a rectangular array of values, or a three-dimensional array of values, or the like. For example, FIG. 2 illustrates an example tile of values, arranged in accordance with at least some implementations of the present disclosure. As shown in FIG. 2, a tile 210 may include values v1-v32 associated with pixels 220-1,1 through 220-4,8, for example. The values may include color data or depth data or the like associated with pixels 220-1,1 through 220-4, for example. FIG. 2 illustrates an example rectangular array of values; however, the tile of values may have any shape, as discussed. Further, although discussed herein with respect to pixel or image data, in general, the techniques discussed herein may be applied to any suitable data.

The tile of values may include any suitable values such as, for example, 24-bit integer depth values, 32-bit floating-point depth values, G-buffer data containing normals, multi-sample anti-aliasing (MSAA) data, red green blue alpha (RGBA) color values, a subset of RGBA values such as 8-bit red green blue alpha (R8G8B8A8) color values, or a pseudo luminance/intensity orange chrominance green chrominance alpha (YCoCgA) color value, or the like. In some examples, the values may each include an individual value. In other examples, individual values of may include two or more components. For example, in color space examples, individual values may include color components such as RGBA components or the like. In general the components may include any suitable components or values such as, for example, 16-bit floating-point values, 32-bit floating-point values, or an interleaved array of 8-bit values, 16-bit values, 32-bit values, or 64-bit values, or the like, wherein obtaining the tile of the plurality of values comprise at least one of retrieving the tile of the plurality of values from the memory or generating the tile of the plurality of values at a codec module, wherein the codec module is implemented via at least one of a central processing unit or a graphics processing unit.

Figure 3:
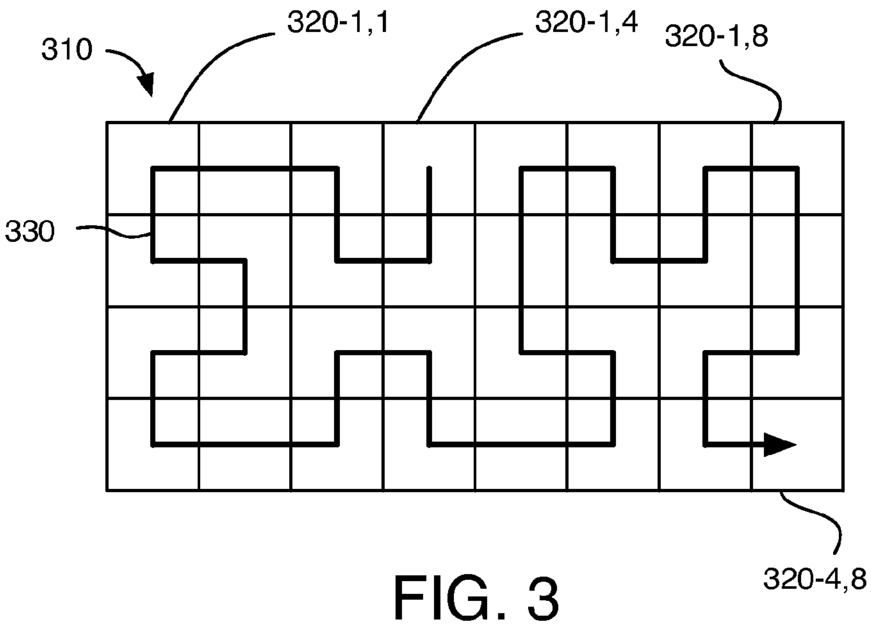
FIG. 3 illustrates an example re-ordering of a tile of values.

Returning to FIG. 1, process 100 may continue from block 102 to block 104, "Re-Order Values to Generate Linear List of Values", where the values of the tile may be re-ordered to generate a linear list of values. In general, the re-ordering may be performed in any suitable manner such as, for example, re-ordering the values based on one or more pre-determined shapes or patterns. Further, the re-ordering may be based on the data type of the tile of values such that a re-ordering technique may be determined based on the data type of the tile of values. For example, FIG. 3 illustrates an example re-ordering of a tile of values, arranged in accordance with at least some implementations of the present disclosure. As shown in FIG. 3, a tile 310 may include values (not shown for the sake of clarity of presentation) associated with color data of pixels 320-1,1 through 320-4,8 and the values may be re-ordered in a manner that may extract coherency from the values. For example, as shown in FIG. 3, a pattern 330 may be used to re-order the data associated with pixels 320-1,1 through 320-4,8. As shown, pattern 330 may begin at pixel 320-1,4 and may proceed through tile 310 in a snake-like manner generally progressing through tile 310 in an order that may increase the likelihood that the adjacent (e.g., re-ordered pixels and associated values) pixels may have the same or similar color. As shown, pattern 330 may end at pixel 320-4,8. In some examples, pattern 330 may be a Hilbert curve, which may help extract coherency, as discussed. Further, a Hilbert curve pattern may be advantageous with the compression of coarse pixel shading (CPS) tiles, for example.

Figure 4:
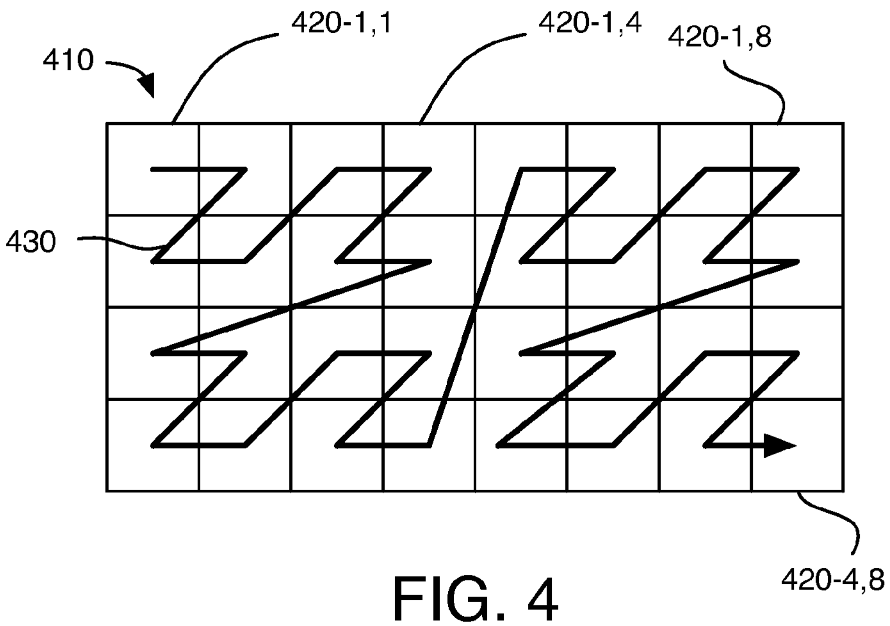
FIG. 4 illustrates an example re-ordering of a tile of values.

Various other re-ordering shapes or patterns may be implemented. For example, FIG. 4 illustrates an example re-ordering of a tile of values, arranged in accordance with at least some implementations of the present disclosure. As shown, a tile 410 may include values (not shown) associated with data of pixels 420-1,1 through 420-4,8. In the illustrated example, tile 410 may include depth data associated with pixels 420-1,1 through 420-4,8. As shown, a pattern 430 may begin at pixel 420-1,4 and may proceed through tile 410 in a zigzag manner generally progressing through tile 410 in an order that may increase the likelihood that the adjacent (e.g., re-ordered pixels and associated values) pixels may have the same or similar depth values. In some examples, pattern 430 may be a zigzag curve. For example, pattern 430 may begin at pixel 420-1,4 and may proceed through tile 410 in a zigzag manner generally progressing through tile 410, including proceeding between directly adjacent tiles, skipping over directly adjacent tiles (e.g., vertically and horizontally adjacent tiles), and/or skipping over diagonally adjacent tiles; while pattern 330 may proceed in a snake-like manner generally progressing through tile 310 only between directly adjacent tiles.

Figure 5:
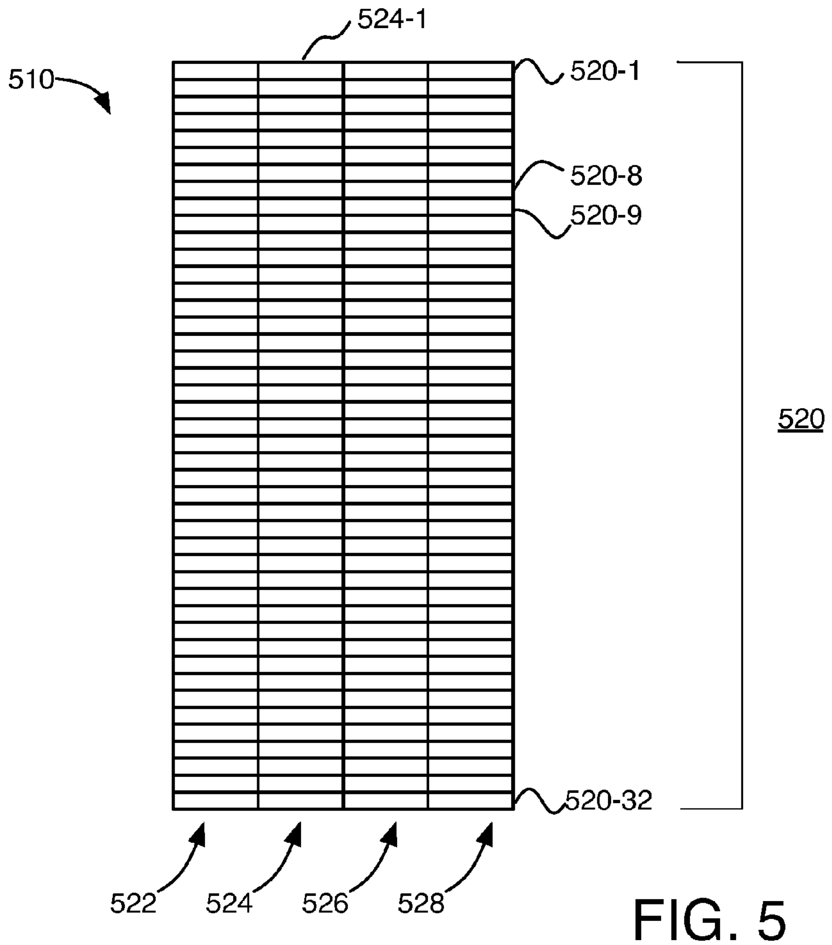
FIG. 5 illustrates an example list of linear values.

As discussed, at block 104, a tile of values may be re-ordered to generate a linear list of values. FIG. 5 illustrates an example list of linear values, arranged in accordance with at least some implementations of the present disclosure. As shown in FIG. 5, a list of linear values 510 may include values 520 (actual values are not shown for the sake of clarity). Also as shown, values 520 may have components 522, 524, 526, and/or 528. For example, one or more or each of individual values 520 may have four components as shown. As discussed, in some examples, individual values 520 may not have components and list of linear values 510 may include only a list of individual values (e.g. without components 522, 524, 526, and/or 528). Further, although shown with four components, in general, individual values 520 may include any number of components such as for example, two, three, five, or more components. Further, although individual values 520 are shown all having the same type of data, individual values 520 may include data of different types such as for example, a mix of individual values, values having components, color data, depth data, or other data types discussed herein.

Also as discussed, the re-ordering may be based on the type of data of the tile of values. In general, a re-ordering parameter associated with re-ordering of the values may be determined or generated based on the re-ordering. The re-ordering parameter may indicate the pattern or shape or other technique used to re-order the list or the like. For example, the re-ordering parameter may indicate a Hilbert curve, a zigzag curve, or no change, or the like. In general, the re-ordering parameter may include any suitable data type such as, for example, an integer value.

Figure 6:
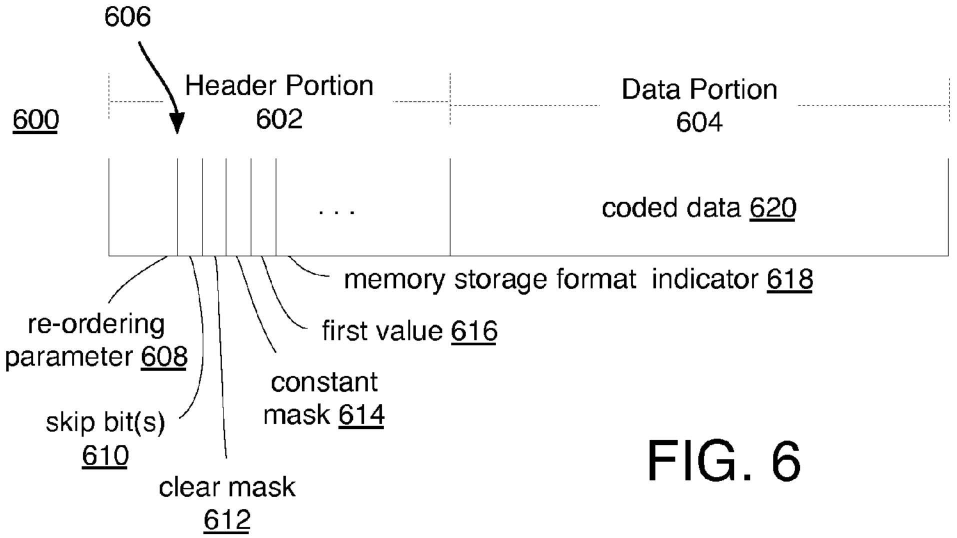
FIG. 6 illustrates example coded data.

As is discussed further below, in some examples, a header may be stored and associated with stored data. For example, FIG. 6 illustrates example coded data 600, arranged in accordance with at least some implementations of the present disclosure. As shown, coded data 600 may include a header portion 602 and a data portion 604. Also as shown, header portion 602 may include or be coded with one or more indicators 606. For example, indicators 606 may include a re-ordering parameter 608, a skip bit 610, a clear mask 612, a constant mask 614, a first value of a linear list of values 616, and/or memory storage format indicator 618 or the like, as is discussed in greater detail herein. As shown, in some examples, re-ordering parameter 608 may be included in header portion 602. In other examples, the re-ordering parameter may be excluded from the header or header portion since the re-ordering type or technique may be determined from the data type. For example, color data may be re-ordered using a first technique (e.g., a Hilbert curve), depth using a second technique (e.g., a zigzag curve), and so on. Such techniques may be standardized such that no the re-ordering parameter may be required in header portion 602. For example, for a particular type of surface, a certain type of pattern may always be used. For example, for a depth surface, a zigzag pattern may always be used, or the like.

Returning to FIG. 1, process 100 may continue from block 104 to block 106, "Determine Skip Bit(s) and Remove Components", where a skip bit may be determined and a component or components may be removed from the linear list of values. As discussed, in some examples, and in particular examples where the linear list of values include color data, the individual values may include two or more components. For example, if the values include RGBA values, each value may include four components (e.g., one each for red, green, blue, and alpha). In such examples, one or more components of the individual values may be constant over an entire tile and a skip bit may be determined that may indicate the component is constant over the tile and the constant value may only be stored once (instead of multiple times). Referring to FIG. 5, assuming individual value 520-1 includes a component 524 that is constant over list of vales 510 (e.g., component 524-1 is the same as 524-2 through 524-32), then a skip bit may be determined that may indicate component 524 is constant over the entire list of values 510 (and the tile it represents, for example).

Referring now to FIG. 6, as shown, in some examples, first value (e.g., first in order) of a linear list of values 614 (e.g., value 520-1 in FIG. 5) may be included in header portion 602 of data 600. As discussed, in other examples, the first value may be stored in data portion 604. In any event, the first value of the linear list of values may be stored in memory. Therefore, skip bit 610 may indicate a component of first value 614 is constant over an entire linear list of values or tile, as discussed. For example, if a skip bit associated with a component of first value 614 is set to 1, that component may be constant over the tile. In some examples, a single skip bit may be stored for an entire linear list of values. In other examples, a skip bit may be stored for each value in the linear list of values (indicating at each value, the relevant component is constant and may be "skipped"). As an illustrative example, in the R8G8B8A8 color space, an alpha value (component A8) of 255 may indicate the represented color is fully opaque. Such a situation may be relatively common and, for example, it may be common for an entire tile to have an A8 component value of 255 for every value of the linear list. In such examples, the component 255 in the first value may be stored in memory (either in the header or data portion, for example) and a skip bit (or multiple skip bits) may indicate that component 255 is the same for each value.

Returning now to FIG. 1, block 106 may also include removing components associated with the determined skip bit. For example, referring to FIG. 5, components 524-2 through 524-32 may be removed from the list of linear values. For example, for each value of the linear list of values other than the first value, the component of each value associated with the skip bit may be removed. As discussed, the component may not be removed from the first value since the first value contains the component that is constant over the tile. However, the associated component may be removed for all the other values, since it was determined to be constant over the tile. Continuing the above illustrative example, the first value (of the list of linear values) may include 255 for component A8 (either in a header portion or a data portion). For each of the other values in the linear list of values (other than the first value), the A8 component may be removed. Such techniques may offer significant compression and may save substantial memory bandwidth. As will be appreciation first component of the first value to generate a second linear list of values, wherein the component of each value associated with the first component of the first value comprises a same color component, wherein the component of each value associated with the first component of the first value is equal to the first component, wherein the same color component comprises an alpha value (A8) color component, and wherein the first component comprises 255

Returning to FIG. 1, process 100 may continue from block 106 to block 108, "Determine Clear Mask", where a clear mask associated with the linear list of values may be determined. In general, a clear mask may indicate one or more values have been cleared or may be cleared from a list of linear values. In some examples, a clear mask may include 1 bit per value for cleared values. For example, for a tile of 8×4 pixels, a 32-bit clear mask may be stored to indicate the values have been cleared or removed from the linear list. In some examples, a clear mask may be used with respect to depth data where cleared values may be relatively common Referring to FIG. 6, as shown, in some examples, clear mask 612 may be included in header portion 602. As shown, in some examples, a clear mask may indicate values have been cleared from the linear list of values in the coding. In other examples, block 108 may include removing the cleared value from the linear list of values. In some examples, the clear mask may be considered a bitmask or a constant bitmask or the like.

Returning to FIG. 1, process 100 may continue from block 108 to block 110, "Determine Constant Mask and Remove Values", where one or more constant masks may be determined. For example, referring to linear list of values 510 in FIG. 5, assuming consecutive values 520-8 and 520-9 are the same, value 520-9 may be removed and a constant mask (e.g., a bit) may be stored, offering substantial memory bandwidth savings. In general, neighboring pixels may frequently have the same colors and such a constant mask may take advantage of this fact in implementations where color data is being compressed. Further, as discussed, the linear list of values may have been previously re-ordered (at block 104) to increase the probability of neighboring pixels having the same color. Such a constant mask technique may be generalized such that a constant mask (e.g., a constant mask bit value of 1) may indicate value k is the same as value k−1 in the linear list of values (e.g., value k−1 precedes value k) and value k may be removed from the linear list of values. In some examples, a linear list of values may include one or more G-buffers containing normals and normals may often be the same for neighboring pixels. In such examples, one or more constant masks may indicate the values in the linear list of values are the same. As shown in block 110, the repeated values, if any, may be removed from the linear list of values, as discussed.

As shown in FIG. 1, in some examples, blocks 106, 108, and 110 may be performed serially. However, as discussed herein, in general, the blocks of FIG. 1 may be performed in any order and some blocks may be skipped entirely. In some examples, grouping 130 of blocks 106, 108, 110 may be performed in parallel or substantially in parallel. In other examples, one or more of grouping 130 may be skipped depending on the type of data being processed. For example, block 106 may be more advantageous for color data but may be skipped for depth data while the opposite may be the case for block 108, or the like. As discussed, in some examples, both a clear mask and a constant mask may be used. In other examples only one or the other may be used based on the type of data being compressed. For example, a clear mask may be more suitable for depth data while a constant mask may be more suitable for color data.

Also, as discussed, a linear list of values may be obtained or determined and subsequently manipulated. In general, the linear list of values may be provided to grouping 140 of block 112, 114, 116 at any point in processing. For example, a linear list of values may be obtained at block 102 and sent directly to grouping 140 for processing. In other examples, a linear list of values determined at block 104 may be sent to grouping 140 for processing. Further, as discussed, one or more blocks of grouping 130 may be applied to a linear list received from block 102 or block 104, processed and transferred to grouping 140 for processing. As will be appreciated, a wide range of options may be available depending on the type of data obtained or generated for processing. In any event, a linear list of values may be transferred to grouping 140 for subsequent processing.

As shown, process 100 may continue from block 110 (or other blocks, as discussed) to block 112, "Determine Differences and Bits (B1) Needed to Store Encoded Differences", where differences may be determined for the list of linear values and the number of bits (B1) needed to store the differences encoded using an encoding technique may be determined. For example, differences may be determined for consecutive values of a linear list of values. Referring to FIG. 5, the differences may be determined by taking the difference between values 520-1 and 520-2, 520-2 and 520-3, and so on. Further, as shown at block 112, the number of bits (B1) needed to store the differences encoded using an encoding technique may be determined. In general, the encoding technique may include any encoding technique such as entropy encoding techniques including Elias gamma coding, Fibonacci coding, Huffman coding, arithmetic coding, or Golomb-Rice coding, or the like.

Process 100 may continue from block 112 to block 114, "Determine Differences-of-Differences and Bits (B2) Needed to Store Encoded Differences-of-Differences", where differences-of-differences may be determined for the list of linear values and the number of bits (B2) needed to store the differences-of-differences encoded using an encoding technique may be determined. For example, differences-of-differences may be determined for consecutive values of a linear list of values. Referring to FIG. 5, the differences-of-differences may be determined by determining the difference between values 520-1 and 520-2, 520-2 and 520-3, and so on, and subsequently taking the differences of the determined differences. Further, as shown at block 114, the number of bits (B2) needed to store the differences-of-differences encoded using an encoding technique may be determined. In general, the encoding technique may include any encoding technique such as entropy encoding techniques including Elias gamma coding, Fibonacci coding, Huffman coding, arithmetic coding, or Golomb-Rice coding, or the like.

Process 100 may continue from block 114 to block 116, "Determine Bits (B3) Needed to Store Linear List of Values", where a number of bits needed to store the linear list of values may be determined. For example, the linear list of values may be evaluated without further compression to sum the number of bits needed to store the linear list of values, or the like.

Process 100 may continue from block 116 to block 118, "Determine Memory Storage Format", where a memory storage format may be determined. For example, the memory storage format may include one of the linear list of values (e.g., the linear set of values without further compression), an encoding of the plurality of differences using an encoding technique, or an encoding of the plurality of differences-of-differences using an encoding technique (the encoding techniques may be the same or different).

As discussed herein, the goal of some codec techniques may be to achieve a bit budget in a memory bandwidth context. For example, memory bandwidth may be associated with a limit or a cache line or the like which may provide limits (e.g., 512 bits or the like) for memory transactions. If a codec may transmit or store data less than the limit, the number of transactions associated with the data may be reduced saving power and increasing performance.

For example, for buffer compression, there may be several pre-selected desired bit budgets that a technique may meet to save memory bandwidth. For example, if a tile (or list of values or the like) may use 2048 bits uncompressed, three different desired bit budgets may be 512 bits (25% compression), 1024 bits (50% compression), or 1536 bits (75% compression). The smallest bit budget may be the most desirable as it saves the most bandwidth (and power). As discussed, skip bits may make the number of components in the values smaller such that the skip bits and the length of a linear list of values (after it has been shortened according to the discussed clear and/or constant mask) may be used to determine whether the remaining data in the linear list of values may be stored in uncompressed form to reach one of the desired bit budgets. For example, if the number of bits (B3) needed to store the linear list of values (along with any header data, for example) is less than a bit budget, the data may be stored uncompressed (e.g., a memory storage format of the linear list of values may be chosen).

However, as discussed, the encoded differences or encoded differences-of-differences may meet an even smaller bit budget, which may offer greater memory bandwidth savings. For example, assuming the linear list of values may be stored in 1024 bits (or fewer), giving 50% compression but the encoded differences (or encoded differences-of-differences) may be stored in 512 bits (or fewer), it may be possible to reach 25% and therefore choosing a memory storage format of an encoding of the differences (or an encoding of the differences-of-differences) may be advantageous.

Therefore, in some examples, the memory storage format may be chosen based on which format meets the smallest bit budget. For example, determining the memory storage format may include comparing B1, B2, and B3 to a bit budget and, if only one of B1, B2, or B3 satisfies the bit budget, the associated memory storage format may be chosen. In other examples, B1, B2, and B3 may be compared to more than one bit budget and for whichever of B1, B2, or B3 meets the smallest bit budget, the associated memory storage format may be chosen. If two or more of B1, B2, or B3 satisfy the same bit budget without any satisfying a smaller bit budget, then an alternative criteria may be used to choose the memory storage format. For example, if B3 meets the smallest available bit budget, it may be used since it requires no encoded and may therefore save processing power on both encoding and subsequent decoding. In some examples, B1, B2, and/or B3 may be compared to a bit budget while in other examples, B1, B2, and B3 and the associated header information may be compared to bit budget.

In some examples, a memory storage format associated with the determined memory storage format may be determined and coded. The memory storage format may indicate which memory storage format may be used. For example, the memory storage format may be one of the linear list of values (without further compression), encoded differences, or encoded differences-of-differences. For example, referring to FIG. 6, memory storage format 618 may be stored in header portion 602. For example, memory storage format 618 may indicate which memory storage format (e.g., the linear list of values (without further compression), encoded differences, or encoded differences-of-differences) may be used. of. Further, in some examples, memory storage format 618 may indicate an encoding technique used to encode the differences or the differences-of-differences.

Returning to FIG. 1, as shown, in some examples, blocks 112, 114, and 116 may be performed serially. However, as discussed herein, in general, the blocks of FIG. 1 may be performed in any order and some may be skipped entirely. In some examples, grouping 140 may be performed in parallel or partially in parallel or the like. In other examples, one or more of grouping 140 may be skipped depending on the type of data being processed. For example, block 114 may be more advantageous for depth data, which may frequently give differences-of-differences values of zero since rendered triangles may be planar. In some examples, block 112 may be advantageous for color data, and so on.

Process 100 may continue from block 118 to block 120, "Code Header and Data", where a header and data for storage may be coded. For example, data associated with the linear list of values (as discussed) may be coded to one of the linear list of values (without further compression), encoded differences, or encoded differences-of-differences. Further, in some examples, a header may be coded. For example, referring to FIG. 6, header portion 602 may be coded with indicators 606 including one or more of re-ordering parameter 608, skip bit(s) 610, clear mask 612, constant mask 614, first value of the linear list of values 616, and/or memory storage format indicator 618, or the like. Further, as shown, the data portion may include coded data 620, which may include the linear list of values (without further compression), encoded differences, or encoded differences-of-differences.

Process 100 may continue from block 120 to block 122, "Store Data Using Storage Format", where data associated with or representing the linear list of values and formatted according to the determined memory storage format may be stored in memory. For example, as discussed, one or more of blocks 102-120 may be implemented via a codec module such that the discussed data may be transferred from the codec module to memory using memory bandwidth as described.

As will be discussed in greater detail below, a system, such as a computer-implemented system may be used to perform some or all of the various operations discussed herein in connection with FIGS. 1-8.

Figure 7:
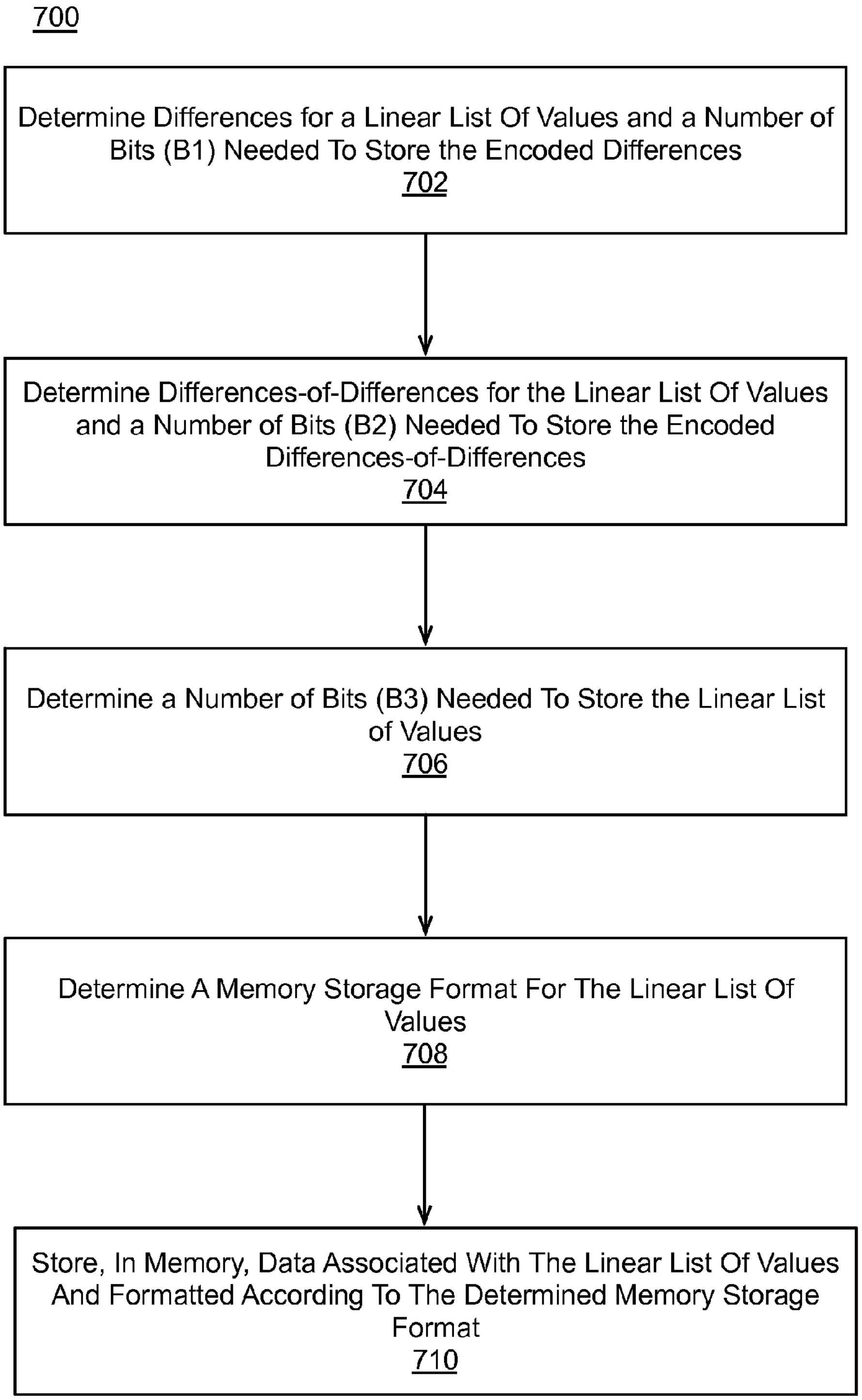
FIG. 7 is a flow chart illustrating an example process for compressing data.

FIG. 7 is a flow chart illustrating an example process 700 for compressing data, arranged in accordance with at least some implementations of the present disclosure. In general, process 700 may provide a computer-implemented method for coding data. In the illustrated implementation, process 700 may include one or more operations, functions or actions as illustrated by one or more of blocks 702, 704, 706, 708 and/or 710. By way of non-limiting example, process 700 will be described herein with reference to operations discussed with respect to FIGS. 1-6 above and example system 1000 discussed further below.

Process 700 may be utilized as a computer-implemented method for coding data. Process 700 may begin at block 702, "Determine Differences for a Linear List Of Values and a Number of Bits (B1) Needed To Store the Encoded Differences", where a plurality of differences for a linear list of values and a first number of bits needed to store the plurality of differences encoded using a first encoding technique may be determined. For example, differences may be determined for linear list of values 510 may be determined by (e.g., a linear list of values after prior compression such as, for example, determining skip bits, clear masks, and/or constant masks, or the like) by taking the difference between values 520-1 and 520-2, 520-2 and 520-3, and so on. Further, the number of bits (B1) needed to store the differences encoded using an encoding technique may be determined.

Processing may continue from operation 702 to operation 704, "Determine Differences-of-Differences for the Linear List Of Values and a Number of Bits (B2) Needed To Store the Encoded Differences-of-Differences", where a plurality of differences-of-differences for the linear list of values and a second number of bits (B2) needed to store the plurality of differences-of-differences encoded using a second encoding technique may be determined. For example, the differences-of-differences for linear list of values 510 may be determined by determining the difference between values 520-1 and 520-2, 520-2 and 520-3, and so on, and subsequently taking the differences of the determined differences. Further, the number of bits (B2) needed to store the differences-of-differences encoded using an encoding technique may be determined.

Processing may continue from operation 704 to operation 706, "Determine a Number of Bits (B3) Needed To Store the Linear List of Values", where a third number of bits (B3) needed to store the linear list of values may be determined. For example, the linear list of values 510 may be evaluated without further compression to sum the number of bits needed to store the linear list of values, or the like. As discussed, in various examples, blocks 702, 704, and/or 706 may be performed in parallel or one or more of the blocks may be skipped.

Processing may continue from operation 706 to operation 708, "Determine A Memory Storage Format For The Linear List Of Values", where a memory storage format for the linear list of values may be determined such that the memory storage data format may be one of the linear list of values, an encoding of the plurality of differences using the first encoding technique, or an encoding of the plurality of differences-of-differences using the second encoding technique. In some examples, the determination of which memory storage format may be implemented may be performed in any suitable manner as discussed herein. For example, the determination of the memory storage format may include comparing B1, B2, and B3 to a bit budget and, if only one B1, B2, or B3 satisfies the first bit budget, the memory storage format is the format associated number of bits meeting the bit budget. In some examples, the determination of the memory storage format may include comparing B1, B2, and B3 two or more bit budgets (e.g., a first bit budget and a second bit budget with the second bit budget being less than the first bit budget) and, if only one B1, B2, or B3 satisfies the lower (e.g., the second) bit budget, the memory storage format is the format associated number of bits meeting the lower bit budget. In yet other examples, the determination of the memory storage format may include B1, B2, and B3 to a bit budget and, if two or more of B1, B2, and B3 satisfy the bit budget, the determination may further include evaluating a most efficient storage format from B1, B2, and B3. For example, a most efficient storage format may be one that requires less processing time or steps (either on compression or decompression) or the like.

Processing may continue from operation 708 to operation 710, "Store, In Memory, Data Associated With The Linear List Of Values And Formatted According To The Determined Memory Storage Format", where data associated with the linear list of values and formatted according to the determined memory storage format may be stored in memory. For example, one or more of blocks 702-708 may be implemented via a codec module such that the discussed data may be transferred from the codec module to memory using memory bandwidth as described for storage at the memory.

Figure 8:
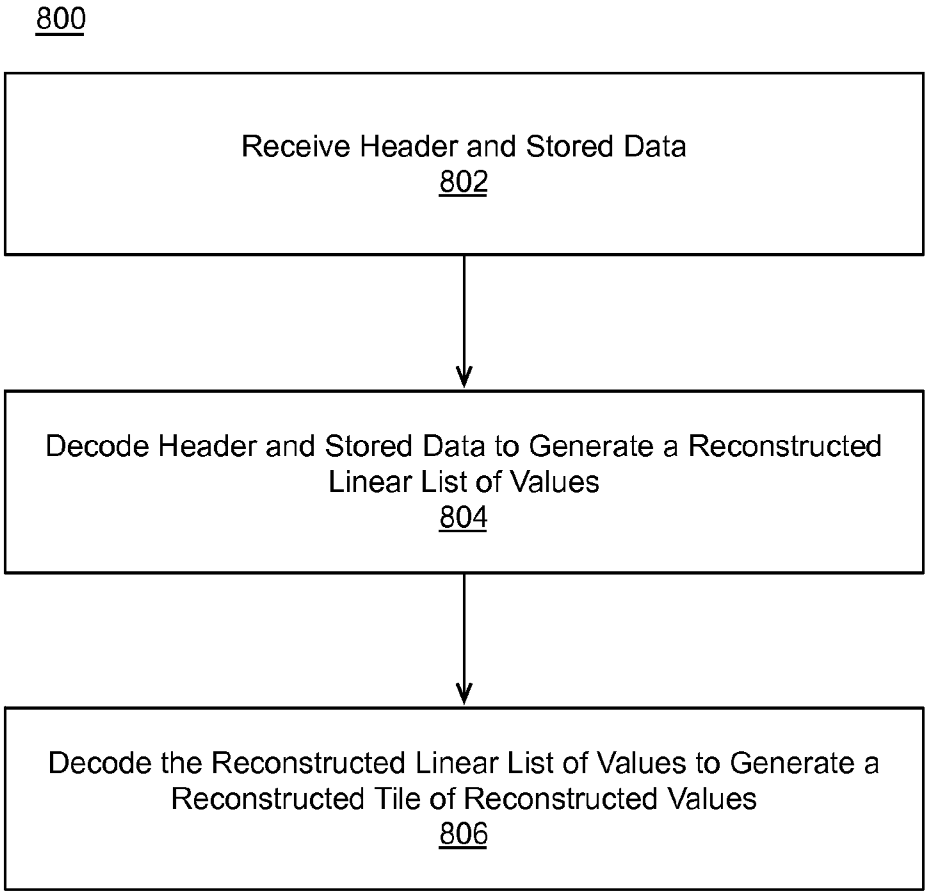
FIG. 8 is a flow chart illustrating an example process for decompressing data.

FIG. 8 is a flow chart illustrating an example process 800 for decompressing data, arranged in accordance with at least some implementations of the present disclosure. In general, process 800 may provide a computer-implemented method for decoding data. In the illustrated implementation, process 800 may include one or more operations, functions or actions as illustrated by one or more of blocks 802,804, and/or 806. By way of non-limiting example, process 800 will be described herein with reference to operations discussed with respect to FIGS. 1-6 above and example system 1000 discussed further below.

Process 800 may be utilized as a computer-implemented method for decoding data. Process 800 may begin at block 802, "Receive Header and Stored Data", where a header and stored data may be received at any suitable device, such as for example, a codec module. The header may include any suitable header as discussed herein such as, for example, header portion 602 of coded data 600. Similarly, the stored data may include any suitable stored data such as data compressed as described herein such as, for example, data portion 604 of coded data 600.

Processing may continue from operation 802 to operation 804, "Decode Header and Stored Data to Generate a Reconstructed Linear List of Values", where the header and the stored data may be decoded to generate a reconstructed linear list of values. For example, coded or compressed data may be decoded or decompressed based on the stored data and the header. As discussed, header portion may include one or more of a re-ordering parameter 608, a skip bit 610, a clear mask 612, a constant mask 614, a first value of a linear list of values 616, and/or memory storage format indicator 618 or the like. As will be appreciated the described indicators 606 may be utilized to decode coded data 620. For example, memory storage format indicator 618 may include an encoding technique such as an entropy encoding technique. Based on the encoding technique, coded data 620 may first be entropy decoded (if applicable). Further, memory storage format indicator 618 may include an indication of which memory storage format (e.g., the linear list of values (without further compression), encoded differences, or encoded differences-of-differences) was used to store coded data 620. Based on the memory storage format and/or first value 616, a reconstructed linear list of values may be determined. For example, if encoded differences were used, after decoding, the determined differences may be sequentially added to the first value to determine the list of linear values. Further, if any of a skip-bit, a clear mask, or a constant mask were used, the list of linear values may be re-populated with the removed values and/or components to generate the reconstructed linear list of values (e.g., similar to or the same as linear list of values 510).

Processing may continue from operation 804 to operation 806, "Decode the Reconstructed Linear List of Values to Generate a Reconstructed Tile of Reconstructed Values", where the reconstructed linear list of values may be decoded to generate a reconstructed tile of a plurality of reconstructed values. For example, based on the reconstructed linear list of values and a re-ordering parameter (if any) the tile of reconstructed values may be determined. For example, linear list of values 510 may be re-ordered using the inverse of pattern 330 or 430 or the like to reconstruct tile 210 or the like. As discussed above, in some examples, a re-ordering parameter may not be utilized and the re-ordering (if any) of the linear list of values may be based on the type of data being re-ordered instead of a re-ordering parameter. For example, as discussed, color data may be re-ordered using a first technique (e.g., a Hilbert curve), depth using a second technique (e.g., a zigzag curve), and so on.

As will be appreciated, a wide range of coding or compression and decoding or decompression combinations may be achieved using the described techniques. In various examples, all of the compression techniques may be used while in other examples, none, one or several of the techniques may be used. Further, in various examples, encoded differences, encoded differences-of-differences, or a list of linear values (without further compression) may be utilized. Such techniques may offer the advantage of flexibility such that, depending on the data type being compressed, a suitable compression technique may be utilized. Such processes may increase compression and memory bandwidth savings (and the associated power savings or performance increases), as described.

While implementation of example processes discussed herein may include the undertaking of all blocks shown in the order illustrated, the present disclosure is not limited in this regard and, in various examples, implementation of processes 100, 700, or 800 may include the undertaking only a subset of the blocks shown and/or in a different order than illustrated.

In addition, any one or more of the blocks or operations discussed herein (such as the operations illustrated and discussed with respect to FIGS. 1-8) may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks or operations discussed herein.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
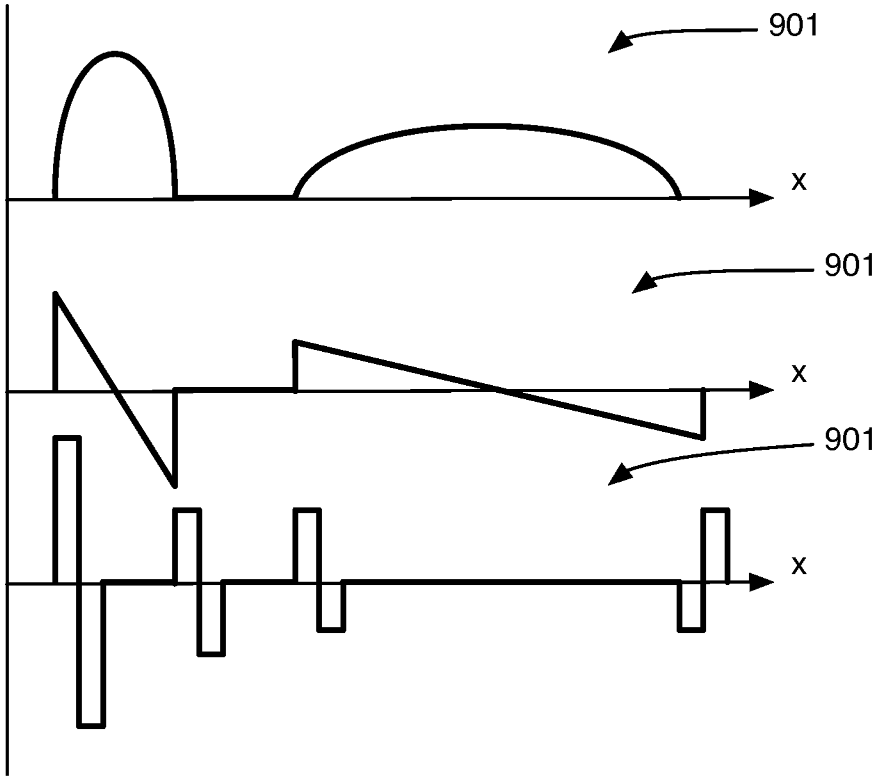
FIG. 9 illustrates an example signal function, an example differences function, and an example differences-of-differences function.

As discussed, in various examples, it may be advantageous, depending on the type of data in a linear list of data, to determine a memory storage format based on the linear list of data itself, differences determined from the linear list of data, or differences-of-differences determined from the linear list of data. FIG. 9 illustrates an example signal function, an example differences function, and an example differences-of-differences function, arranged in accordance with at least some implementations of the present disclosure. As shown, function 901 may illustrate a base signal function associated with a linear list of values, function 902 may illustrate a differences function based on function 901 and function 903 may illustrate a differences-of-differences function abased on function 901. In general, function 902 may be described as a differences function or a derivative and function 903 may be described as a differences-of-differences function or a second derivative function. Depending on the data of the linear list of values, FIG. 9 illustrates different properties of first derivatives (differences) and/or second derivatives (differences-of-differences), such as, fore example, the number of transitions and amplitudes of functions 901, 902, 903, may make the data more or less suitable for difference or difference-of-difference encoding. For example, planar surfaces (e.g., depth functions for rasterized polygons) may include few high-frequency transitions, which would make differences-of-differences encoding advantageous.

Also, as discussed, the described techniques may be implemented on any suitable data. In some examples, the techniques may be applied to multi-sample anti-aliasing (MSAA). For Nx MSAA (i.e., with N samples per pixel), a plane 0 may always populated first, followed by plane 1, 2, . . . N, with higher level planes generally only being populated as needed and typically sparsely. The described techniques may exploit the discussed sparseness via constant mask described herein. Further, in some examples, for each sample plane of the available planes, a bit may be determined that indicates an entire plane is unused. In such examples, nothing may be stored for that plane (except for the bit indicating the plane is unused). Such an unused MSAA plane bit may be included in header portion 602 of data 600 (see FIG. 6), for example. In other examples, a bit may be determined for one or more sub-tiles of a tile. For example, for an 8×4 tile, one or more sub-tile bits may be determined for sub-tiles. For example, if two 4×4 sub-tiles are used, a bit for each 4×4 pixel may be determined for each MSAA plane. Such unused MSAA sub-tile bits may similarly be included in header portion 602 of data 600. Such techniques may offer the advantage of increased compression as discussed herein.

Further, as described, in various examples, differences of a linear list of values may be encoded using entropy encoding or differences-of-differences are of a linear list of values encoded using entropy encoding. It is noted that entropy encoding is generally a variable bit length coding method such that smaller values will use fewer bits and bigger values will use more bits. The universal codec described herein may generally take advantage of entropy encoding being a variable bit length coding method since the differences and differences-of-differences computations may typically make the values to be encoded small.

As described, the techniques discussed herein may be used for image data such as color data, depth data, normals, or the like. In general, the discussed techniques may be used for any type of data. For example, the discussed techniques may be suitable for unordered access view (UAV) data, general CPU data, stochastic rasterization of motion blur data, and/or depth of field data, or the like. Such implementations may typically introduce noisy data. In such implementations, samples or sample data in a tile may be grouped after the extra dimensions (e.g., for motion blur one group all samples with similar times (t), and for depth of field, one group all samples with similar lens positions, (u,v)) and the described technics may extract the coherency in the data. In particular, since the described re-ordering or traversal methods may independent of the dimensionality of the underlying data, the tile value re-ordering into a list of linear values may be performed in any number of dimensions, as discussed. For example, as long as data may be laid out in memory according to a coherency preserving layout, shape, or pattern, the tile re-ordering as discussed may adapt to this layout and extract the coherency.

Further, as described, in some examples, lossless (e.g., without loss of data) compression may be provided. In other examples, a lossy variant may be added to the described techniques. The addition of a lossy variant may provide for greater compression rates in some examples. For example, a user may provide a quantizer value, q, which may determine how many bits the differences or differences-of-differences should be shifted right by. For example, assuming three values, $v_0$, $v_1$, $v_2$, differences, $d_0=v_1-v_0$, and $d_1=v_2-v_1$ may be determined (as discussed above). However, for lossy compression, it may be determined that $d_{0q}=d_0>>q$, so that the difference may be shifted q steps to the right. In general, the quantization may be performed in any suitable manner. When the difference is reconstructed, a shift left by q steps may be made, which may provide a slightly incorrect value (in most cases) of $d_0$, which may be designated $d_{0r}$, which may be given as $d_{0r}=d_{0q}<<q$. In general, the difference between $d_0$ and $d_{0r}$ may be inserted into the next difference; otherwise, the quantization errors may accumulate, for example. Therefore, $d_0-d_{0r}$ may be added to $d_1$ before it is quantized such that $d_{1q}=(d_1+(d_0-d_{0r}))>>q$, and so on. Similar corrections may be provided for differences-of-differences in a lossy example. Such error corrections may ensure that errors do not accumulate. The lossy techniques may be modified to better handle lossless high-frequency, low amplitude data (e.g., stochastic depth). For example, the quantization parameter may be used to encode the most significant bits (MSBs), as described. However, in some examples, instead of discarding the least significant bits (LSBs), they could, instead, be stored uncompressed. In general, any rounding techniques may be used. As discussed, in some examples, the rounding may include a floor operation or the like. In other examples, other rounding techniques may be implemented.

Figure 10:
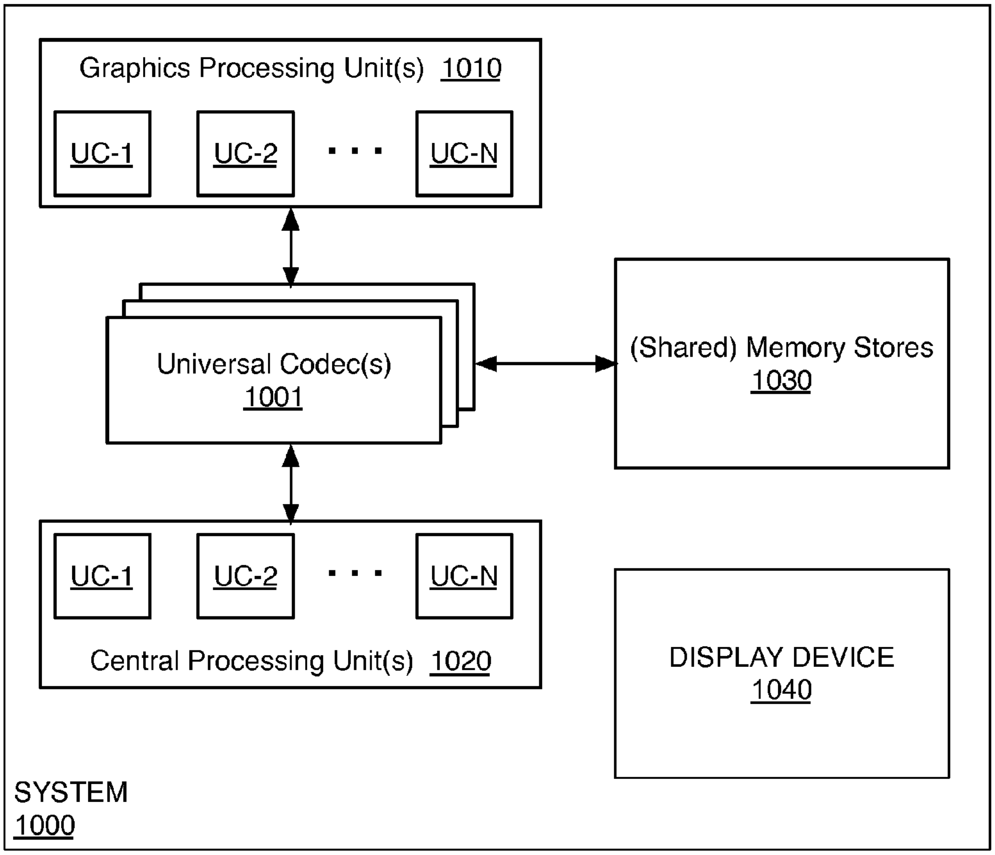
FIG. 10 is an illustrative diagram of an example system for compressing and/or decompressing data.

FIG. 10 is an illustrative diagram of an example system 1000 for coding and/or decoding data, arranged in accordance with at least some implementations of the present disclosure. In the illustrated implementation, system 1000 may include one or more graphics processing units 1010, one or more central processing units 1020, one or more memory stores 1030, and/or a display device 1040. Central processing units 1010, memory stores 1030, graphics processing units 1010, and/or display device 1040 may be capable of communication with one another, via, for example, cache lines, a bus or other access. In various implementations, display device 1040 may be integrated in system 1000 or implemented separately from system 1000.

As shown in FIG. 10, and discussed above, any number of universal codec(s) 1001 may be implemented via graphics processing units 1010 and/or central processing units 1020 as illustrated as UC-1 through UC-N implemented via graphics processing units 1010 and as UC-1 through UC-M implemented via central processing units 1020, for example. In general, the universal codec(s) may be implemented as codec modules as described herein.

As shown, in some examples, system 1000 may include memory (e.g. memory stores 1030) and graphics processing unit(s) 1010. Graphics processing unit(s) 1010 may include a codec module (e.g., UC-1 or UC-2 or the like), and graphics processing unit(s) 1010 may be communicatively coupled to memory stores 1030. The codec module may be configured to determine a plurality of differences for a linear list of values and a first number of bits needed to store the plurality of differences encoded using a first encoding technique, determine a plurality of differences-of-differences for the linear list of values and a second number of bits needed to store the plurality of differences-of-differences encoded using a second encoding technique, determine a third number of bits needed to store the linear list of values, determine a memory storage format for the linear list of values such that the memory storage data format includes at least one of the linear list of values, an encoding of the plurality of differences using the first encoding technique, or an encoding of the plurality of differences-of-differences using the second encoding technique, and transfer, to memory stores 1030, data associated with the linear list of values and formatted according to the determined memory storage format.

The codec module may be further configured to perform compression as described herein such as, for example, the codec module may be configured to obtain a tile of a plurality of values, re-order the plurality of values of the tile to generate a linear list of values, determine a re-ordering parameter associated with re-ordering, determine a skip bit associated with various components of values of the linear list of values, remove components based on the skip bit(s), determine a clear mask associated with the linear list of values, determine a constant mask associated with values of linear list of values, remove values based on the constant mask, code a header, and/or transfer the header to memory stores 1030, or the like, as discussed herein.

Further, in some examples, system 1000 may include central processing unit(s) 1020. Central processing unit(s) 1020 may include a codec module (e.g., UC-1 or UC-2 or the like) Codec modules of graphics processing unit(s) 1010 and/or central processing unit(s) 1020 may be configured to receive a header and the stored data, decode the header and the stored data to generate a reconstructed linear list of values, and/or decode the reconstructed linear list of values to generate a reconstructed tile of a plurality of reconstructed values, or the like, as discussed herein.

As discussed, in some examples, a codec module implemented via graphics processing unit(s) 1010 may perform compression and a codec module implemented via graphics processing unit(s) 1010 or central processing unit(s) 1020 may perform decompression. In various other examples, compression and/decompression may be performed at graphics processing unit(s) 1010 and/or central processing unit(s) 1020 in any combination.

As will be appreciated, the modules illustrated in FIG. 10 may include a variety of software and/or hardware modules and/or modules that may be implemented via software and/or hardware. For example, the modules may be implemented as software via central processing units 1020 and/or graphics processing units 1010 or the modules may be implemented via a dedicated hardware portion or portions of graphics processing units 1010. Further, the shown memory stores 1030 may be shared memory (as shown) for central processing units 1010 and/or graphics processing units 1030, for example. Also, system 1000 may be implemented in a variety of ways. For example, system 1000 (excluding display device 1040) may be implemented as a single chip or device having a graphics processor, a quad-core central processing unit, on-board cache, and a memory controller input/output (I/O) module (not shown). In other examples, system 1000 (again excluding display device 1040) may be implemented as a chipset.

Central processing unit(s) 1010 may include any suitable implementation including, for example, microprocessor(s), multicore processors, application specific integrated circuits, chip(s), chipsets, or the like. Further, graphics processing unit(s) 1020 may include any suitable implementation including, for example, processor(s), multicore processors, application specific integrated circuits, programmable logic devices, graphics cards, integrated graphics, general purpose graphics processing unit(s), or the like. In addition, memory stores 1030 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1030 may be implemented via cache memory. In various examples, system 1000 may be implemented as a chipset or as a system on a chip.

Figure 11:
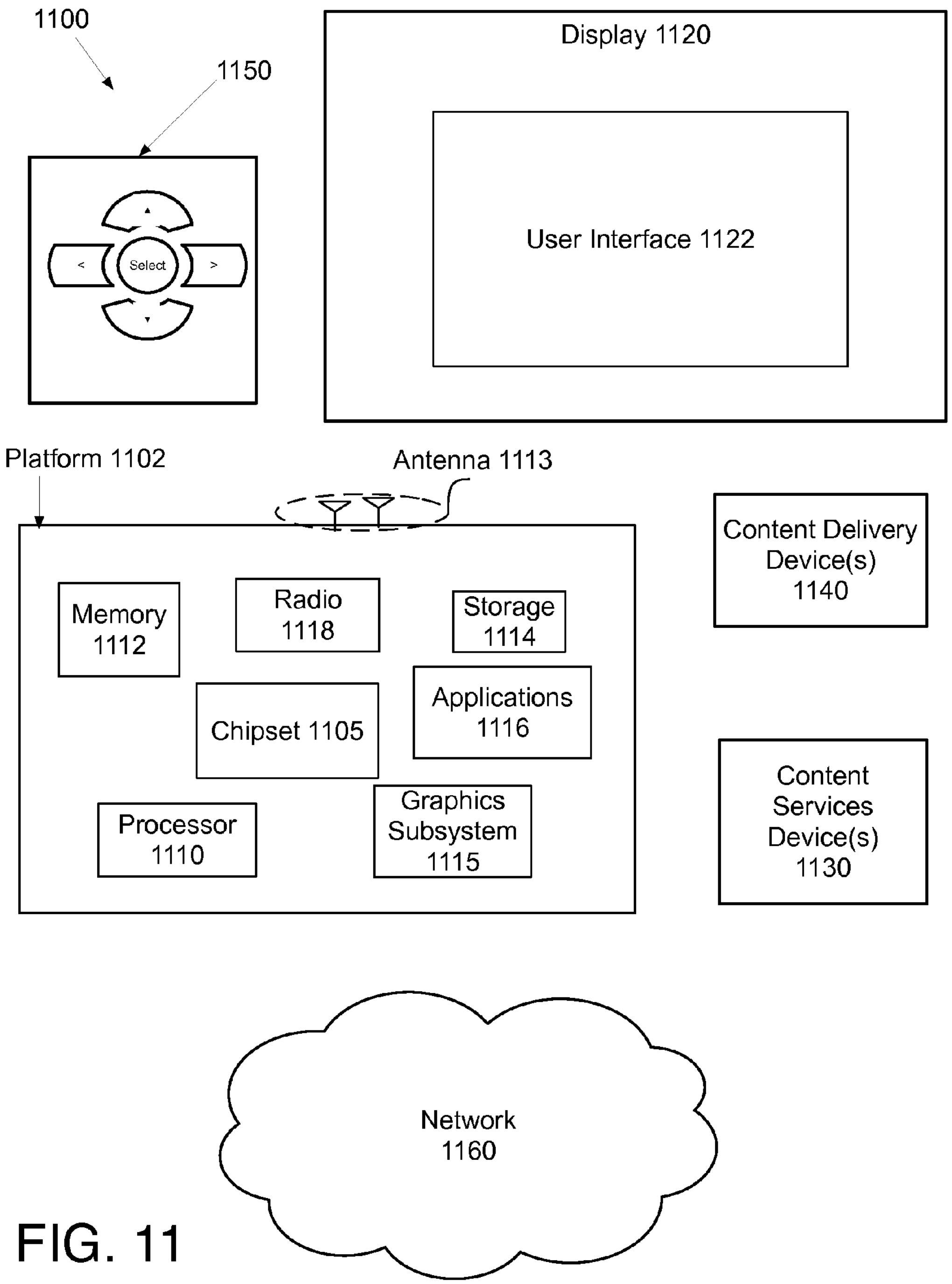
FIG. 11 is an illustrative diagram of an example system.

FIG. 11 illustrates an example system 1100 in accordance with the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off" In addition, chipset 1105 may include hardware and/or software support for 11.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
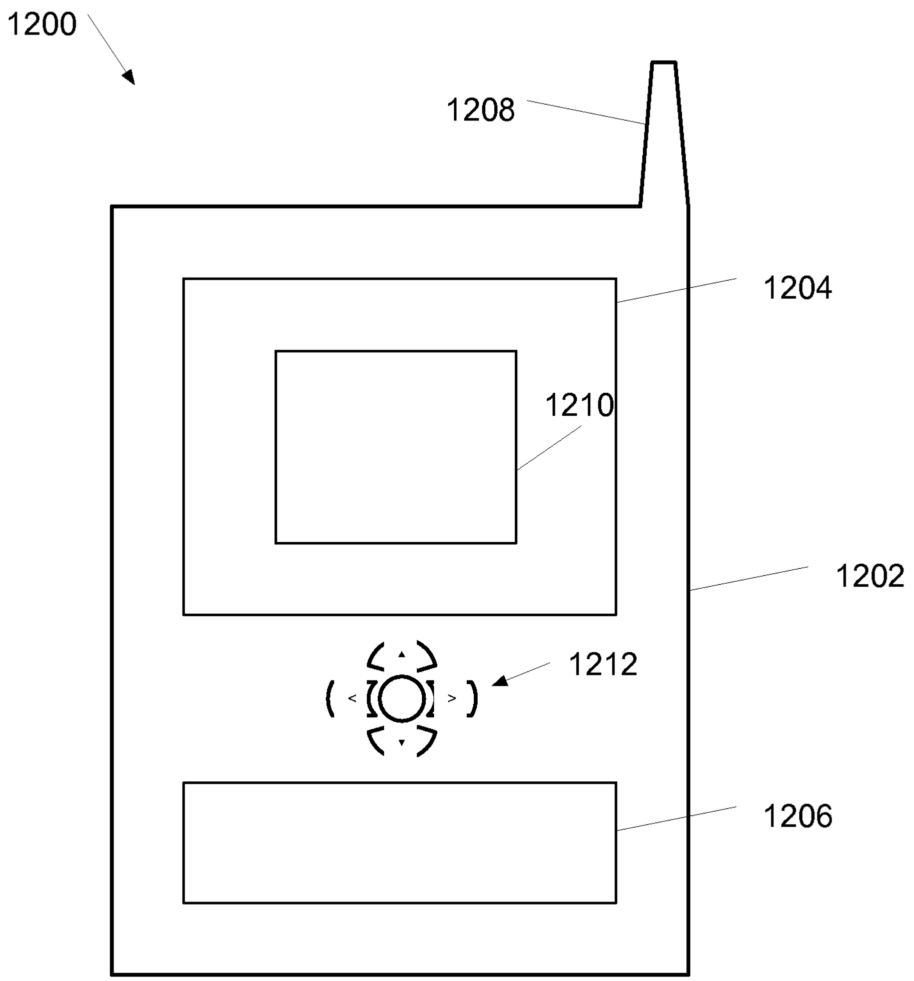
FIG. 12 illustrates an example device, all arranged in accordance with at least some implementations of the present disclosure.

As described above, system 1100 may be embodied in varying physical styles or form factors. FIG. 12 illustrates implementations of a small form factor device 1200 in which system 1100 may be embodied. In embodiments, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing 1202, a display 1204, an input/output (I/O) device 1206, and an antenna 1208. Device 1200 also may include navigation features 1212. Display 1204 may include any suitable display unit for displaying information appropriate for a mobile computing device. PO device 1206 may include any suitable PO device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for coding data may include determining a plurality of differences for a linear list of values and a first number of bits needed to store the plurality of differences encoded using a first encoding technique, determining a plurality of differences-of-differences for the linear list of values and a second number of bits needed to store the plurality of differences-of-differences encoded using a second encoding technique, determining a third number of bits needed to store the linear list of values, determining a memory storage format for the linear list of values, wherein the memory storage data format comprises at least one of the linear list of values, an encoding of the plurality of differences using the first encoding technique, or an encoding of the plurality of differences-of-differences using the second encoding technique, and storing, in memory, data associated with the linear list of values and formatted according to the determined memory storage format.

In a further example of a computer-implemented method for coding data, a tile of a plurality of values may be obtained such that the plurality of values may include at least one of a linear array of values, a rectangular array of values, or a three-dimensional array of values, the plurality of values may include at least one of a 24-bit integer depth value, a 32-bit floating-point depth value, an R8G8B8A8 value, an RGBA value, or a YCoCgA value, the plurality of values may each include a plurality of components, the plurality of components may include at least one of a 16-bit floating-point value, a 32-bit floating-point value, or an interleaved array of 8-bit values, 16-bit values, 32-bit values, or 64-bit values, obtaining the tile of the plurality of values may include at least one of retrieving the tile of the plurality of values from the memory or generating the tile of the plurality of values at a codec module, and the codec module may be implemented via at least one of a central processing unit or a graphics processing unit. The plurality of values of the tile may be re-ordered to generate a first linear list of values such that re-ordering the plurality of values may include at least one of re-ordering the plurality of values based on one or more pre-determined shapes, re-ordering the plurality of values based on a Hilbert curve wherein the plurality of values comprise color data, or re-ordering the plurality of values based on a zigzag curve wherein the plurality of values comprise depth data. A re-ordering parameter associated with re-ordering the plurality of values to generate the first linear list of values may be determined such that the re-ordering parameter may include an integer. A skip bit associated with a first component of a first value of the first linear list of values may be determined such that the first component may include a color component, the color component may include an alpha value (A8), and the skip bit may be set to 1. For each value of the first linear list of values other than the first value, a component of each value associated with the first component of the first value may be removed to generate a second linear list of values such that the component of each value associated with the first component of the first value may include a same color component, the component of each value associated with the first component of the first value may be equal to the first component, the same color component may include an alpha value (A8) color component, and the first component may be 255. At least one clear mask associated with the first linear list of values may be determined such that the at least one clear mask may indicate one or more values cleared from the first linear list of values, the clear mask may include a 32-bit clear mask and the first linear list of values may include depth values. At least one constant mask associated with a third value of the first linear list of values may be determined such that the at least one constant mask may indicate the third value may be the same as a second value of the first linear list of values, and the second value of the first linear list of values may precede the third value of the first linear list of values. The third value may be removed from at least one of the first linear list of values or the second linear list of values to generate a third linear list of values. A header at least one of the re-ordering parameter, the skip bit, the at least one clear mask, the at least one constant mask, or the first value of the first linear list of values may be coded. The header may be stored in memory such that the header may be associated with the stored data. The header and the stored data may be received at a second codec module such that the second codec module may be implemented via at least one of a central processing unit or a graphics processing unit. The header and the stored data may be decoded to generate a reconstructed linear list of values. The reconstructed linear list of values may be decoded to generate a reconstructed tile of a plurality of reconstructed values. Determining the memory storage format may include comparing the first number of bits, the second number of bits, and the third number of bits to a first bit budget such that only the first number of bits satisfies the first bit budget, and the memory storage format may be the encoding of the plurality of differences. Determining the memory storage format may include comparing the first number of bits, the second number of bits, and the third number of bits to the first bit budget and a second bit budget such that the second bit budget is less than the first bit budget, the first number of bits and the second number of bits satisfy the first bit budget, only the first number of bits satisfies the second bit budget, and such that the memory storage format may be the encoding of the plurality of differences. Determining the memory storage format may include comparing the first number of bits, the second number of bits, and the third number of bits to the first bit budget, wherein the first number of bits, the second number of bits, and the third number of bits satisfy the first bit budget, and determining the memory storage format may further include evaluating a most efficient storage format, and wherein the memory storage format comprises the linear list of values. The second bit budget may be associated with a cache line. The first bit budget may be at least one of 256 bits, 512 bits or 1024 bits. The first encoding technique may be a first entropy encoding technique and the first entropy encoding technique may be at least one of Elias gamma coding, Fibonacci coding, Huffman coding, arithmetic coding, or Golomb-Rice coding. The second encoding technique may be a second entropy encoding technique and the second entropy encoding technique may be at least one of Elias gamma coding, Fibonacci coding, Huffman coding, arithmetic coding, or Golomb-Rice coding. The linear list of values may be at least one of the first linear list of values, the second linear list of values, or the third linear list of values. The tile may be 8×4 pixels.

In another example, a system for coding data on a computer may include a memory and a graphics processing unit. The graphics processing unit may include a codec module. The graphics processing unit may be communicatively coupled to the memory and the codec module may be configured to determine a plurality of differences for a linear list of values and a first number of bits needed to store the plurality of differences encoded using a first encoding technique, determine a plurality of differences-of-differences for the linear list of values and a second number of bits needed to store the plurality of differences-of-differences encoded using a second encoding technique, determine a third number of bits needed to store the linear list of values, determine a memory storage format for the linear list of values, wherein the memory storage data format comprises at least one of the linear list of values, an encoding of the plurality of differences using the first encoding technique, or an encoding of the plurality of differences-of-differences using the second encoding technique, and transfer, to the memory, data associated with the linear list of values and formatted according to the determined memory storage format.

In a further example of a system for coding data on a computer, the system may include a central processing unit including a second codec module. The central processing unit may be communicatively coupled to the memory and the second codec module may be configured to receive a header and the stored data, decode the header and the stored data to generate a reconstructed linear list of values, and decode the reconstructed linear list of values to generate a reconstructed tile of a plurality of reconstructed values. The codec module may be further configured to obtain a tile of a plurality of values such that the plurality of values include at least one of a linear array of values, a rectangular array of values, or a three-dimensional array of values, the plurality of values may include at least one of a 24-bit integer depth value, a 32-bit floating-point depth value, an R8G8B8A8 value, an RGBA value, or a YCoCgA value, the plurality of values may each include a plurality of components, wherein the plurality of components may include at least one of a 16-bit floating-point value, a 32-bit floating-point value, or an interleaved array of 8-bit values, 16-bit values, 32-bit values, or 64-bit values, obtaining the tile of the plurality of values may include at least one of retrieving the tile of the plurality of values from the memory or generating the tile of the plurality of values at a codec module, and the codec module may be implemented via at least one of a central processing unit or a graphics processing unit. The codec module may be further configured to determine a re-ordering parameter associated with re-ordering the plurality of values to generate the first linear list of values such that the re-ordering parameter comprises an integer. The codec module may be further configured to determine a skip bit associated with a first component of a first value of the first linear list of values such that the first component may include a color component, the color component may include an alpha value (A8), and the skip bit may be set to 1. The codec module may be further configured to remove, for each value of the first linear list of values other than the first value, a component of each value associated with the first component of the first value to generate a second linear list of values such that the component of each value associated with the first component of the first value may include a same color component, the component of each value associated with the first component of the first value may be equal to the first component, the same color component may include an alpha value (A8) color component, and the first component may be 255. The codec module may be further configured to determine at least one clear mask associated with the first linear list of values such that the at least one clear mask indicates one or more values cleared from the first linear list of values, the clear mask may be a 32-bit clear mask and the first linear list of values may include depth values. The codec module may be further configured to determine at least one constant mask associated with a third value of the first linear list of values such that the at least one constant mask may indicate the third value is the same as a second value of the first linear list of values, and the second value of the first linear list of values precedes the third value of the first linear list of values. The codec module may be further configured to remove the third value from at least one of the first linear list of values or the second linear list of values to generate a third linear list of values. The codec module may be further configured to code the header including at least one of the re-ordering parameter, the skip bit, the at least one clear mask, the at least one constant mask, or the first value of the first linear list of values. The codec module may be further configured to transfer the header to the memory such that the header may be associated with the stored data. The determination of the memory storage format may include comparing the first number of bits, the second number of bits, and the third number of bits to a first bit budget such that only the first number of bits satisfies the first bit budget, and the memory storage format may be the encoding of the plurality of differences. The determination of the memory storage format may include comparing the first number of bits, the second number of bits, and the third number of bits to the first bit budget and a second bit budget such that the second bit budget is less than the first bit budget, the first number of bits and the second number of bits satisfy the first bit budget, only the first number of bits satisfies the second bit budget, and such that the memory storage format may be the encoding of the plurality of differences. The determination of the memory storage format may include comparing the first number of bits, the second number of bits, and the third number of bits to the first bit budget, wherein the first number of bits, the second number of bits, and the third number of bits satisfy the first bit budget, and determining the memory storage format may further include evaluating a most efficient storage format, and wherein the memory storage format comprises the linear list of values. The second bit budget may be associated with a cache line. The first bit budget may be at least one of 256 bits, 512 bits or 1024 bits. The first encoding technique may be a first entropy encoding technique and the first entropy encoding technique may be at least one of Elias gamma coding, Fibonacci coding, Huffman coding, arithmetic coding, or Golomb-Rice coding. The second encoding technique may be a second entropy encoding technique and the second entropy encoding technique may be at least one of Elias gamma coding, Fibonacci coding, Huffman coding, arithmetic coding, or Golomb-Rice coding. The linear list of values may be at least one of the first linear list of values, the second linear list of values, or the third linear list of values. The tile may be 8×4 pixels.

In a further example, at least one machine readable medium may include a plurality of instructions that in response to being executed on a computing device, cause the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A method comprising:

obtaining, by a universal codec communicatively coupled to and as facilitated by at least one of a graphics processor and an application processor of a computing device, a tile of a plurality of values, wherein the universal code is employed in lieu of one or more compressors and decompressors;

determining, by the universal codec, a data type of the plurality of values, wherein the data type is a type of image data represented by each of the plurality of values;

selecting, by the universal codec, a shape corresponding to the data type, wherein the shape is selected from between at least a first shape corresponding to a first data type and a second shape corresponding to a second data type;

re-ordering, by the universal codec, the plurality of values of the tile to generate a first linear list of values, wherein re-ordering the plurality of values is based at least in part on the selected shape; and determining, by the universal codec, at least one clear mask associated with the first linear list of values, wherein the at least one clear mask indicates one or more values cleared from the first linear list of values.

2. The method of claim 1, further comprising:

determining a re-ordering parameter associated with re-ordering the plurality of values to generate the first linear list of values;

determining a plurality of differences for a linear list of values and a first number of bits needed to store the plurality of differences encoded using a first encoding technique;

determining a plurality of differences-of-differences for the linear list of values and a second number of bits needed to store the plurality of differences-of-differences encoded using a second encoding technique;

determining a third number of bits needed to store the linear list of values;

determining a memory storage format for the linear list of values, wherein the memory storage format comprises at least one of the linear list of values, an encoding of the plurality of differences using the first encoding technique, or an encoding of the plurality of differences-of-differences using the second encoding technique;

storing, in memory, data associated with the linear list of values and formatted according to the determined memory storage format;

determining at least one constant mask associated with a first value of a first linear list of values, wherein the at least one constant mask indicates the first value is the same as a second value of the first linear list of values, and wherein the second value of the first linear list of values precedes the first value of the first linear list of values; and removing the first value from the first linear list of values to generate the linear list of values.

3. The method of claim 1, wherein the first shape comprises a Hilbert curve, and wherein the second shape comprises a zigzag curve.

4. The method of claim 1, further comprising:

determining a skip bit associated with a first component of a first value of the first linear list of values; and removing, for each value of the first linear list of values other than the first value, a component of each value associated with the first component of the first value to generate the linear list of values.

5. The method of claim 1, further comprising:

determining a skip bit associated with a first component of a first value of the first linear list of values;

removing, for each value of the first linear list of values other than the first value, a component of each value associated with the first component of the first value to generate a second linear list of values;

determining at least one clear mask associated with the first linear list of values, wherein the at least one clear mask indicates one or more values cleared from the first linear list of values;

determining at least one constant mask associated with a third value of the first linear list of values, wherein the at least one constant mask indicates the third value is the same as a second value of the first linear list of values, and wherein the second value of the first linear list of values precedes the third value of the first linear list of values;

removing the third value from the first linear list of values;

coding a header comprising a re-ordering parameter, the skip bit, the at least one clear mask, the at least one constant mask, and the first value of the first linear list of values; and storing the header in memory, wherein the header is associated with the linear list of values.

6. The method of claim 2, wherein determining the memory storage format comprises comparing the first number of bits, the second number of bits, and the third number of bits to a bit budget, wherein only the first number of bits satisfies the bit budget, and wherein the memory storage format comprises the encoding of the plurality of differences.

7. The method of claim 2, wherein determining the memory storage format comprises comparing the first number of bits, the second number of bits, and the third number of bits to a first bit budget and a second bit budget, wherein the second bit budget is less than the first bit budget, wherein the first number of bits and the second number of bits satisfy the first bit budget, wherein only the first number of bits satisfies the second bit budget, and wherein the memory storage format comprises the encoding of the plurality of differences.

8. The method of claim 2, wherein determining the memory storage format comprises comparing the first number of bits, the second number of bits, and the third number of bits to a first bit budget, wherein the first number of bits, the second number of bits, and the third number of bits satisfy the bit budget, wherein determining the memory storage format further comprises evaluating a most efficient storage format, and wherein the memory storage format comprises the linear list of values.

9. A system for coding data on a computer, comprising:

a memory;

a central processing unit (CPU) coupled to the memory;

a graphics processing unit (GPU) coupled to the memory and the CPU; and a universal codec communicatively coupled at least one of the CPU and the GPU and is employed in lieu of compressors and decompressors, wherein the universal codec is configured to:

obtain a tile of a plurality of values; determine a data type of the plurality of values, wherein the data type is a type of image data represented by each of the plurality of values;

select a shape corresponding to the data type; wherein the shape is selected from between at least a first shape corresponding to a first data type and a second shape corresponding to a second data type;

re-order the plurality of values of the tile to generate a first linear list of values, wherein re-ordering the plurality of values is based at least in part on the selected shape; and determine at least one clear mask associated with the first linear list of values, wherein the at least one clear mask indicates one or more values cleared from the first linear list of values.

10. The system of claim 9, wherein the universal codec codecmodule is further configured to:

determine a re-ordering parameter associated with re-ordering the plurality of values to generate the first linear list of values;

determine a plurality of differences for a linear list of values and a first number of bits needed to store the plurality of differences encoded using a first encoding technique;

determine a plurality of differences-of-differences for the linear list of values and a second number of bits needed to store the plurality of differences-of-differences encoded using a second encoding technique;

determine a third number of bits needed to store the linear list of values; determine a memory storage format for the linear list of values, wherein the memory storage format comprises at least one of the linear list of values, an encoding of the plurality of differences using the first encoding technique, or an encoding of the plurality of differences-of-differences using the second encoding technique;

transfer, to the memory, data associated with the linear list of values and formatted according to the determined memory storage format;

determine at least one constant mask associated with a first value of a first linear list of values, wherein the at least one constant mask indicates the first value is the same as a second value of the first linear list of values, and wherein the second value of the first linear list of values precedes the first value of the first linear list of values; and remove the first value from the first linear list of values to generate the linear list of values.

11. The system of claim 9, wherein the first shape comprises a Hilbert curve, and wherein the second shape comprises a zigzag curve.

12. The system of claim 9, wherein the universal codec is further configured to:

determine a skip bit associated with a first component of a first value of the first linear list of values; and remove, for each value of the first linear list of values other than the first value, a component of each value associated with the first component of the first value to generate the linear list of values.

13. The system of claim 9, wherein the universal codec is further configured to:

determine a skip bit associated with a first component of a first value of the first linear list of values;

remove, for each value of the first linear list of values other than the first value, a component of each value associated with the first component of the first value to generate a second linear list of values;

determine at least one clear mask associated with the first linear list of values, wherein the at least one clear mask indicates one or more values cleared from the first linear list of values;

determine at least one constant mask associated with a third value of the first linear list of values, wherein the at least one constant mask indicates the third value is the same as a second value of the first linear list of values, and wherein the second value of the first linear list of values precedes the third value of the first linear list of values;

remove the third value from the first linear list of values;

code a header comprising a re-ordering parameter, the skip bit, the at least one clear mask, the at least one constant mask, and the first value of the first linear list of values; and store the header in memory, wherein the header is associated with the linear list of values.

14. The system of claim 10, wherein the determination of the memory storage format comprises comparing the first number of bits, the second number of bits, and the third number of bits to a bit budget, wherein only the first number of bits satisfies the bit budget, and wherein the memory storage format comprises the encoding of the plurality of differences.

15. The system of claim 9, further comprising:

a second codec module implemented via at least one of the graphics processing unit or a central processing unit comprising, wherein the central processing unit is communicatively coupled to the memory and wherein the second codec module is configured to:

receive a header and stored data associated with the linear list of values;

decode the header and the stored data to generate a reconstructed linear list of values; and decode the reconstructed linear list of values to generate a reconstructed tile of a plurality of reconstructed values.

16. At least one non-transitory machine-readable medium comprising a plurality of instructions that in response to being executed on a computing device having a universal codec coupled to and in communication with at least one of a central processing unit (CPU) and a graphics processing unit (GPU) and is employed in lieu of compressors and decompressors, cause the universal codec of the computing device to code data by:

obtaining a tile of a plurality of values; determining a data type of the plurality of values, wherein the data type is a type of image data represented by each of the plurality of values;

selecting a shape corresponding to the data type; wherein the shape is selected from between at least a first shape corresponding to a first data type and a second shape corresponding to a second data type;

re-ordering the plurality of values of the tile to generate a first linear list of values, wherein re-ordering the plurality of values is based at least in part on the selected shape; and determine at least one clear mask associated with the first linear list of values, wherein the at least one clear mask indicates one or more values cleared from the first linear list of values.

17. The non-transitory machine-readable medium of claim 16, further comprising instructions that in response to being executed on the computing device, cause the computing device to code data by:

determining a re-ordering parameter associated with re-ordering the plurality of values to generate the first linear list of values;

determining a plurality of differences for a linear list of values and a first number of bits needed to store the plurality of differences encoded using a first encoding technique;

determining a plurality of differences-of-differences for the linear list of values and a second number of bits needed to store the plurality of differences-of-differences encoded using a second encoding technique;

determining a third number of bits needed to store the linear list of values;

determining a memory storage format for the linear list of values, wherein the memory storage format comprises at least one of the linear list of values, an encoding of the plurality of differences using the first encoding technique, or an encoding of the plurality of differences-of-differences using the second encoding technique;

storing, in memory, data associated with the linear list of values and formatted according to the determined memory storage format;

determining at least one constant mask associated with a first value of a first linear list of values, wherein the at least one constant mask indicates the first value is the same as a second value of the first linear list of values, and wherein the second value of the first linear list of values precedes the first value of the first linear list of values; and removing the first value from the first linear list of values to generate the linear list of values.

18. The non-transitory machine-readable medium of claim 16, wherein the first shape comprises a Hilbert curve, and wherein the second shape comprises a zigzag curve.

19. The non-transitory machine-readable medium of claim 16, further comprising instructions that in response to being executed on the computing device, cause the computing device to code data by:

determining a skip bit associated with a first component of a first value of the first linear list of values; and removing, for each value of the first linear list of values other than the first value, a component of each value associated with the first component of the first value to generate the linear list of values.

20. The non-transitory machine-readable medium of claim 16, further comprising instructions that in response to being executed on the computing device, cause the computing device to code data by:

determining a skip bit associated with a first component of a first value of the first linear list of values;

removing, for each value of the first linear list of values other than the first value, a component of each value associated with the first component of the first value to generate a second linear list of values;

determining at least one constant mask associated with a third value of the first linear list of values, wherein the at least one constant mask indicates the third value is the same as a second value of the first linear list of values, and wherein the second value of the first linear list of values precedes the third value of the first linear list of values;

removing the third value from the first linear list of values;

coding a header comprising a re-ordering parameter, the skip bit, the at least one clear mask, the at least one constant mask, and the first value of the first linear list of values; and storing the header in memory, wherein the header is associated with the linear list of values.

21. The method of claim 1, wherein the plurality of values of the tile each correspond to a respective pixel and the first shape is arranged to progress only through adjacent pixels of the tile.

22. The method of claim 21, wherein the second shape is arranged to progress through pixels of the tile between directly adjacent tiles, skipping over directly adjacent tiles, and skipping over diagonally adjacent tiles.

23. The method of claim 1, wherein the first data type comprises color data, and wherein the second data type comprises depth data.

24. The method of claim 1, further comprising compressing the re-ordered plurality of values of the linear list of values and storing the compressed values in a memory.

* * * * *